W. A. SCHULTHEIS.
GASKET.
APPLICATION FILED JAN. 23, 1909.

956,188.

Patented Apr. 26, 1910.

Witnesses
Earl W. Griffin
Jessie A. Beall

Inventor
William A. Schultheis
By Arthur H. Ewald,
Attorney.

UNITED STATES PATENT OFFICE.

WILLIAM A. SCHULTHEIS, OF CINCINNATI, OHIO.

GASKET.

956,188.

Specification of Letters Patent. Patented Apr. 26, 1910.

Application filed January 23, 1909. Serial No. 473,886.

*To all whom it may concern:*

Be it known that I, WILLIAM A. SCHULTHEIS, a citizen of the United States, and a resident of Cincinnati, county of Hamilton, and State of Ohio, have invented a new and useful Improvement in Gaskets, of which the following is a full, clear, and exact description, reference being had to the accompanying drawings, forming a part of this specification.

My invention relates to gaskets used in the packing of seams and joints in steam, hot water and other fitting where absolutely tight joints are essential.

In the gaskets heretofore employed in such work at least one of the surfaces presented to the ends of the joint is composed of asbestos, rubber or other suitable packing material, and this, under pressure and the other necessary conditions of use, adheres to the joint so that when it becomes necessary, for the purpose of repairs or otherwise, to separate the parts, the gasket by reason of such adhesion is destroyed, and a new one must be substituted when the parts are reassembled.

The object of my invention is to overcome this difficulty, and to provide a gasket of simple and cheap construction, which may be used over and over again by reason of the suitable protection of the packing material.

For the accomplishment of this object my invention consists of a certain novel construction as will hereinafter fully appear.

In the several figures of the drawings like numerals indicate like parts.

Figure 1:
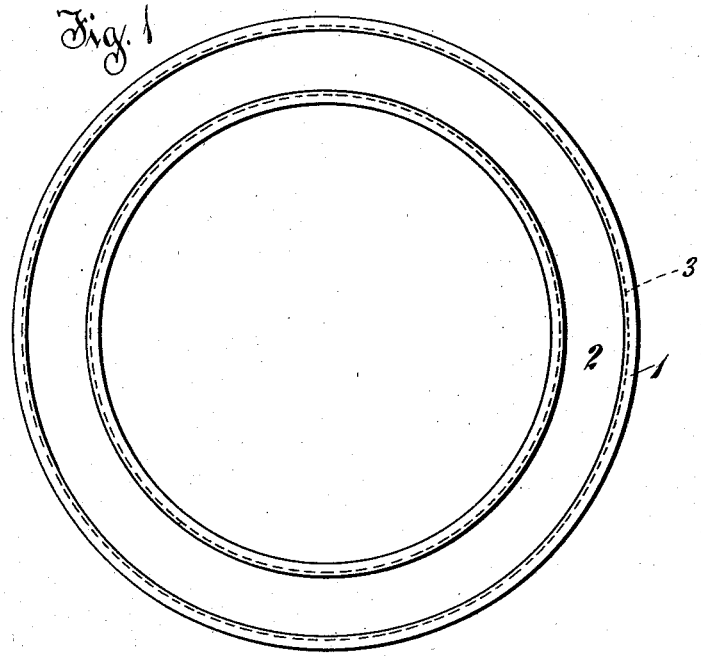
Figure 3:
Figure 2:
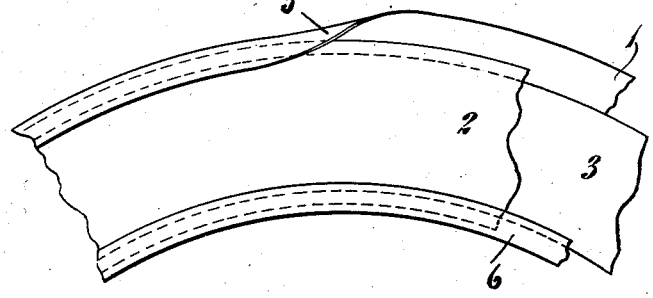

In the drawings Figure 1 is a plan view of my improved gasket. Fig. 2 is a detailed view of the same with parts bent back and broken away to show more clearly the details of construction. Fig. 3 is a cross section.

The numeral 1 indicates an annular sheet of thin, pliable metal, preferably copper, and 2 indicates a similar sheet of the same material, somewhat narrower, however than sheet 1.

3 indicates a layer of asbestos or other suitable packing material, which is placed between the metal sheets 1 and 2 as clearly shown in Figs. 2 and 3. The sheet 1 is wide enough so that flanges 5 and 6 may be turned over and made to overlap sheet 2, and the intervening layer of packing, as also shown in Figs. 2 and 3, and that said sheets 1 and 2 may thus form a metal sheath entirely enveloping said packing layer.

Having thus described my invention what I claim as new and desire to secure by Letters Patent, is:

1. A gasket comprising a sheet of packing material between two pliable metal sheets, said metal sheets being joined together at their edges to form a sheath completely enveloping said sheet of packing material.

2. A gasket comprising a sheet of packing material between two annular pliable metal sheets, one of said metal sheets being of greater width than the other, and being turned over at both its outer and inner circumferences to overlap said sheet of packing material, and the other of said metal sheets.

WILLIAM A. SCHULTHEIS.

Witnesses:
BESSIE A. BEALL,
EARL W. GRIFFIN.